E. SALTZKORN & L. NICOLAI.

KNIFE FOR CUTTING OR SCORING PASTEBOARD.

No. 11,365. Reissued Sept. 12, 1893.

Witnesses:
Jno. E. Parker
J. Henderson.

Inventors:
Emil Saltzkorn and Ludwig Nicolai
by their Attorney,
Horace Pettit.

UNITED STATES PATENT OFFICE.

EMIL SALTZKORN AND LUDWIG NICOLAI, OF DRESDEN, GERMANY.

KNIFE FOR CUTTING OR SCORING PASTEBOARD.

SPECIFICATION forming part of Reissued Letters Patent No. 11,365, dated September 12, 1893.

Original No. 442,738, dated December 16, 1890. Application for reissue filed June 3, 1893. Serial No. 476,532. Patented in Germany April 21, 1889, No. 50,356; in England April 23, 1889, No. 6,797; in France April 29, 1889, No. 197,841; in Belgium May 15, 1889, No. 86,006, and in Austria-Hungary March 15, 1890, No. 40 and No. 719.

*To all whom it may concern:*

Be it known that we, EMIL SALTZKORN and LUDWIG NICOLAI, subjects of the King of Saxony, and residents of the city of Dresden, in the Kingdom of Saxony, in the German Empire, have invented certain new and useful Improvements in or Relating to Knives for Cutting or Scoring Pasteboard and other Analogous Materials, (for which we have obtained Letters Patent in Great Britain, No. 6,797, dated April 23, 1889; in Germany, No. 50,356, dated April 21, 1889; in Belgium, No. 86,006, dated May 15, 1889; in France, No. 197,841, dated April 29, 1889, and in Austria-Hungary, No. 40 and No. 719, dated March 15, 1890,) of which the following is a specification.

The object of this invention is a machine for scoring card-board to be used in the manufacture of boxes and the like.

Owing to the peculiar form of knife employed it acts upon the card-board at three different points at the same time and only scores it.

The knife is secured above the table of the machine to a stock and firmly held in position, preferably adjustably; a carrier or feed roller is provided below the knife for carrying the cardboard against the blade, though it is obvious that the cardboard may be rigidly secured on the table and the scoring knife advanced over it for scoring purposes. By this means the knife is enabled to perform its work more easily and its action upon the cardboard is rendered less forcible than the device used for the same purpose hitherto, and, lastly, a sharper and more serviceable cut is obtained.

Figure 1:
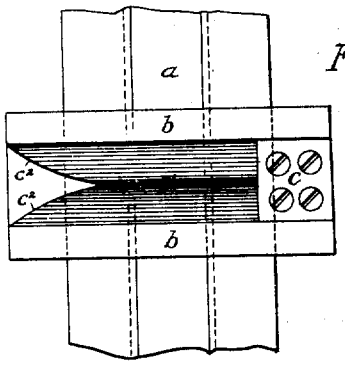
Figure 2:
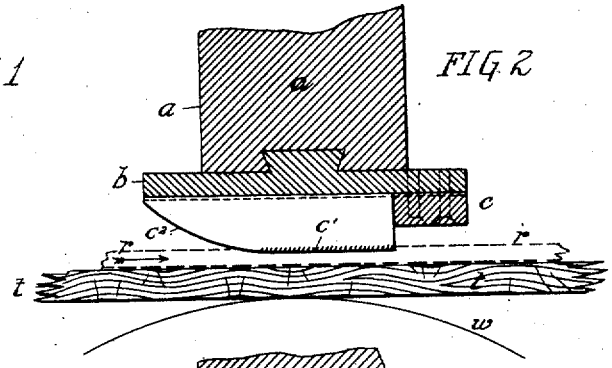
Figure 3:
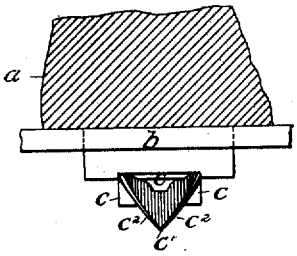
Figure 5:
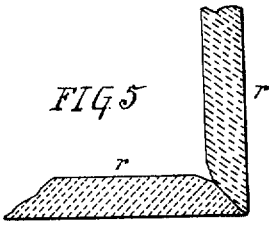
Figure 4:
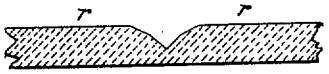
Figure 6:
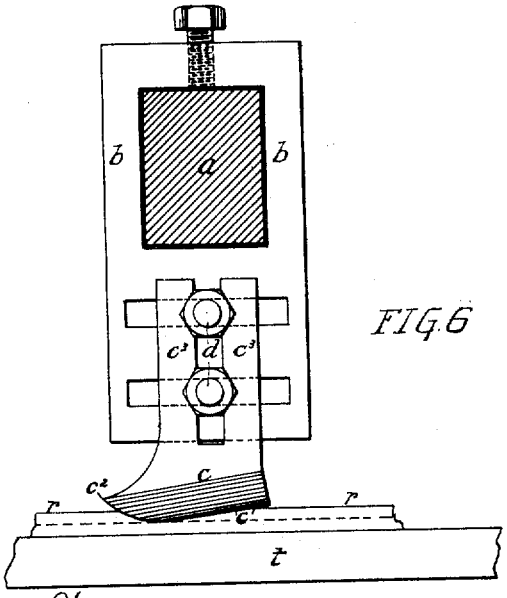

In the accompanying drawings, Figure 1 is a plan of the knife viewed from below. Fig. 2 is a section thereof; Fig. 3, a front view; Fig. 4, a piece of card-board considerably enlarged; and Fig. 5, the same piece, also enlarged and bent at the cut or scored part. Fig. 6 is a side view of a modification of the scoring-knife, and Fig. 7 a front view thereof.

To a stock, *a*, preferably of rectangular form, is attached the knife holder, *b*, which is adjustable in a groove and carries the improved scoring knife, *c*. This knife is miter or wedge shaped, as shown at Figs. 1 and 3, and has a straight cutting edge, $c'$. It is flattened at its backward portion, where it is attached to the knife-holder by means of screws. Being embedded in a groove provided for the purpose in the holder, *b*, it is prevented from lateral displacement. In front, the knife terminates in a swallow-tail formed of two curved blades or cutters, $c^2$, $c^2$, set at an angle to each other.

The card is supposed to be placed on a table, *t*, moved along by a carrier or feed roller, *w*. (See Fig. 2.) When it is thus brought under the knife, the curved blades begin by effecting a flat and rather shallow cut, which, however, grows deeper gradually, and the action of the knife upon the card-board is thereby rendered less abrupt and sharp than it would be if the deepest cut were made at once, so that card-board of an inferior quality and containing more wood can be operated upon without any fear of the blades slipping off or of the card-board being torn. This scoring-knife also admits of a much easier operation of the machine, this, as well as the advantage mentioned before, being due to the distribution of the resistance over the larger surface of the tool and the various directions of its action.

Figure 7:
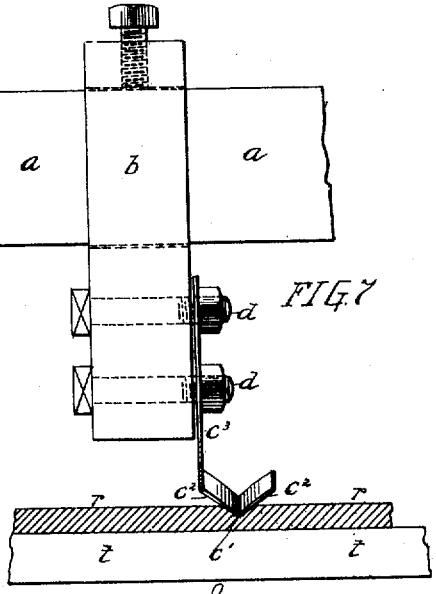

In the modifications shown in Figs. 6 and 7 the knife, instead of being miter-shaped, has the form of a plowshare. Here, too, however, the straight blade, $c'$, divides into two curved ones, $c^2$, $c^2$, inclined toward each other. The knife is attached to the knife-carrier, *b*, by means of its side piece or extension, $c^3$, which is screwed thereto by bolts, *d*, *d*. The plowshare form of the knife permits an easier removal of the chippings, so that the whole surface of the cut is better exposed to view.

By the combination of the two curved blades with a straight one a cut such as represented in Fig. 4 is obtained. This peculiar shape of the cut is of great advantage in making band-boxes and the like, inasmuch as when the card-board is bent at right angles the gradually-flattening edges of the cut leave a space between them, whereby some play is allowed to the compressed portions of the joints, and when it is desired to apply the glue within the box the same is by the shape of the cut enabled the better to enter the joint.

Having thus described our invention, what we claim, and desire to secure by Letters Patent, is—

1. In a pasteboard scoring machine, a table, a scoring knife provided above the same, having the straight blade, $c'$, bifurcated at the front end and formed into two forwardly and upwardly curved blades, $c^2$, said knife carried upon the frame of the machine above the level of the table, and actuating mechanism substantially as described.

2. In a pasteboard scoring machine, a scoring knife having the straight blades, $c'$, bifurcated at the front end and formed into two forwardly and upwardly curved blades, $c^2$, stock, $a$, securing the knife to the frame of the machine, movable table, $t$, provided below the knife and means for carrying the same to and fro, substantially as described.

3. In a pasteboard scoring machine an adjustably disposed scoring knife having the straight blade, $c'$, bifurcated at the front end into two forwardly and upwardly curved blades, $c^2$, stock, $a$, knife carrier, $b$, movable table, $t$, and roller, $w$, for actuating the same, substantially as described.

In witness whereof we have hereunto set our hands this 1st day of April, A. D. 1893.

EMIL SALTZKORN.
LUDWIG NICOLAI.

Witnesses:
HERNANDO DE SOTO,
PAUL ARRAS.